United States Patent Office 3,133,824
Patented May 19, 1964

3,133,824
PROCESS FOR THE PRODUCTION OF FINELY DISPERSED CALCIUM CARBONATE
Ernst Podschus, Leverkusen-Bayerwerk, Germany, assignor to Farbenfabriken Bayer Aktiengesellschaft, Leverkusen, Germany, a corporation of Germany
No Drawing. Filed Oct. 5, 1960, Ser. No. 60,570
Claims priority, application Germany Oct. 16, 1959
9 Claims. (Cl. 106—306)

Calcium carbonate precipitated from an aqueous solution has been used as a filler, particularly in the rubber industry, for a long time. In order to attain a reinforcing effect in the rubber, the filler should be extremely fine-particled while still readily dispersible. Commercial calcium carbonate caoutchouc fillers show BET values between 20 and 35 m.$^2$/g. Electron microscope photographs show that such powders consist of almost cubic small crystals part of which have conglomerated to form secondary agglomerates. In general, the tendency to agglomerate is the greater, the finer the primary particles. The packing of the latter in the agglomerates may become so dense as to render grinding and dispersing difficult. The density of packing or, inversely, the degree of loosening may be characterized by the bulk weight, the settling volume and the oil adsorption. Particularly the oil adsorption or "oil number," that is the amount of linseed oil taken up by 1 g. of the powder until all particles are just completely wetted, gives an indication as to the obtainable particle surface and secondary structure.

The object of the invention is a process for the production of finely dispersed calcium carbonate with a disturbed calcite structure and a loose secondary particle structure, characterized by reacting aqueous calcium-hydroxide suspensions in the presence of active silicic acid with gases containing carbon dioxide. As active silicic acid there is to be understood a low molecular weight silicic acid such as is formed at temperatures below about 50° C. when treating dilute silicate solutions with acid or, for example, when treating a silicate solution with a H$^+$-exchanger resin. Economically, it is particularly advantageous to add silicate solutions, preferably commercial sodium silicate (Na$_2$O·3.3SiO$_2$) in a quantity corresponding to 0.1–20% of SiO$_2$, preferably 0.5–10% of SiO$_2$, referred to CaCO$_3$, to milk of lime. It can be assumed that in the course of the carbonisation process there is formed from the silicate a reactive low molecular silicic acid which apparently impairs the crystal growth of the CaCO$_3$ as can be seen from the X-ray diffraction pattern. In contrast to other known mixed precipitations of non-isomorphous substances, there is however formed not a simple mixture of finely divided CaCO$_3$ and finely divided silicic acid, but, surprisingly, a homogeneous novel filler. It can be concluded from the electron microscope picture that the silicic acid surrounds the CaCO$_3$ crystals to a large extent. Even small additions of silicic acid of the order of 1% of SiO$_2$, referred to CaCO$_3$, and added in the form of sodium silicate, substantially influence the properties of the filler thus formed.

The process proves to be particularly suitable for the manufacture of extremely finely divided calcium carbonate fillers. For this purpose it is expedient to carry out the reaction with dilute carbonic acid containing about 10 to about 50% of CO$_2$, advantageously 10–20% of CO$_2$, at temperatures between about 10 and 30° C. and providing for the precipitation a constant excess of CO$_2$.

When the precipitation starts, the sodium silicate solution is added with intense stirring to the milk of lime the concentration of which is kept below 2 mols, preferably 1 mol of Ca(OH)$_2$. In this manner, CaCO$_3$ fillers with specific surfaces of more than 40–50 m.$^2$/g. are obtainable which, although finely divided, are readily dispersible. An explanation for the surprisingly good dispersibility is supplied by the electron miscrocope picture. The almost spherical CaCO$_3$ particles form loose grape-like secondary agglomerates such as are typical of silicic acid fillers, but have not hitherto been known for CaCO$_3$ fillers. The silicic acid filler-like properties are also apparent in that the precipitate can be flocculated by cation-active additives, a typical feature of silicic acid. This property can be utilised with advantage for filtration, for example by concentrating the precipitate before filtering.

If in addition to active silicic acid there is added to the milk of lime nitrilo-triacetic acid in quantities of 0.01–5%, preferably 0.1–2%, in the form of one of its salts, expediently in the form of the sodium salt, the process of the invention yields CaCO$_3$ particles of changed appearance, i.e. oblong spherical particles which tend to aggregate in the form of little rods. In this way there are obtained under suitable precipitating conditions either fillers of even finer particle size or, if secondary aggregates in the form of little rods are formed, extremely voluminous products on account of the especially loose and bulky packing.

With regard to their reinforcing effect on rubber elastomers the silicic acid-containing calcium carbonate fillers according to the invention may still be improved after precipitation by heating the aqueous suspension at an alkaline pH value up to about 10 to temperatures above 70° C., preferably to about boiling temperature. The silicic acid present on the CaCO$_3$ particles is stabilised by heating in a weakly alkaline medium. The initial porosity of the extremely finely divided amorphous silicic acid layer is reduced, and this becomes manifest in a more or less substantial decrease of the BET value, depending on the content of silicic acid. It is noteworthy that in this case a growth of the CaCO$_3$ crystallites does not occur, whilst precipitation at temperatures above about 70° C. yields coarse-grained CaCO$_3$.

With regard to the reinforcing effect on elastomers the silicic acid-containing calcium carbonate fillers according to the invention are superior to those hitherto known.

According to one mode of operation of the present invention, the reaction is stopped after attaining a pH value between 8 and 12, preferably between 8.5 and 10. In this way there is obtained in silicic acid-modified CaCO$_3$ fillers with high BET values of 70–100 m.$^2$/g. in a reproducible manner a loose secondary structure and thus a good grinding capability and dispersibility. Carbonisation is expediently carried out up to pH 8.5–10. The reaction should not be continued at pH values below 8, since this leads to products of substantially harder agglomeration. This knowledge stands in contrast to the understandable desire to carbonise the Ca(OH)$_2$ completely, in order to obtain a calcium carbonate as neutral as possible.

As is the case with every neutralization reaction, the pH value of the suspension falls from that of Ca(OH)$_2$, i.e. above 12, only towards the end of the reaction within a relatively short time so that a precise pH control is advisable, in order to stop the reaction in time. After stopping the $CO_2$-containing gas stream, the pH value rises in most cases upon further stirring by several tenths, since enclosed $Ca(OH)_2$ dissolves. In order to attain the desired final pH value, this rise may be taken into account from the start or an after-carbonisation may be carried out for a short time. The falling of the pH value in the final phase of carbonisation proceeds the less rapidly, the higher the addition of active silicic acid to the precipitation.

The dependency of the properties of the $CaCO_3$ filler on the final pH value of the reaction can already be recognised during filtration. The higher the water content of the filter cake or the lower the dry contents of the filter cake, the looser the secondary structure, equal size of primary particles or equal specific surface being presupposed. At below pH 8 the dry contents of the filter cake rises strongly, i.e. the particles are more densely packed and dry to form harder agglomerates. An explanation for these observations is supplied by the analytical composition of the final products. In $SiO_2$-containing $CaCO_3$ fillers which according to the invention are reacted only up to a pH value of 8.5–10 there is found, in addition to the resulting $CaCO_3$, a CaO excess approximately corresponding to the $SiO_2$-content in the form of a calcium silicate. It can be assumed that the silicic acid in the form of a calcium hydroxo-silicate causes a linkage of the $CaCO_3$ particles to form loose aggregates. Upon further carbonisation this linkage is destroyed to a large extent with the formation of further $CaCO_3$, the filter cake becomes more dense and binds less water and shrinks upon drying to form harder agglomerates which are ground less easily.

In addition to the pH value, there was found another influence on the secondary structure, i.e. shearing stress in the precipitation. In order to achieve the desired aim to obtain primary particles as fine as possible and having a loose secondary structure, the $CO_2$-containing gas must be finely divided for the purpose of a rapid reaction, but with a shearing effect as low as possible. Particularly advantageous are rapidly rotating gassing stirrers in which the gas is conducted through the hollow stirrer shaft and leaves through apertures at the circumference of the stirrer. Stirrers of this type are described for example in German patent specification No. 1,032,719. The precipitating container itself is expediently fitted with radial wave breakers having a width of about $\frac{1}{10}$ of the diameter of the container (see "Chemie-Ingenieur-Technik" 31, 9 (1959), page 588 ff.). Other conditions of precipitation being equal, such gassing stirrers yield lower dry contents of the filter cake and more voluminous products than the rapidly rotating turbine stirrers, not to mention the strongly shearing stirrers provided with a stator basket.

The following examples are given for the purpose of illustrating the invention.

*Example 1*

To 10 litres of water there are added with stirring 24 g. of commercial sodium silicate ($Na_2O \cdot 3.3SiO_2$; 25% of $SiO_2$) and then 2 litres of a suspension of 444 g. of calcium hydrate $Ca(OH)$. A turbostirrer (Kotthoff mixing mill, rotor diameter 75 mm., 2800 r.p.m.) serves for stirring and distribution of the gas. The gas stream, a mixture of 500 litres of $CO_2$ and 2000 litres of air per hour, is introduced immediately above the turbine by means of a tube attached to the stator support of the stirrer. The reaction is terminated after 25 minutes, the temperature rising from 18 to 25° C. The final pH value is 7.2. The calcium carbonate is filtered off, washed twice in a suction filter, dried at 110° C. and subsequently ground in a pin-mill. The resulting calcium carbonate is a very loose filler with a $SIO_2$ content of about 1%. It has a specific surface according to BET of 47.1 m.$^2$/g. The most finely divided commercial calcium carbonate has a specific surface of about 34 m.$^2$/g.

*Example 2*

In the manner described in Example 1, 12 litres of a 0.5 molar $Ca(OH)_2$ suspension (444 g. of calcium hydrate) to which 48 g. of commercial sodium silicate corresponding to 2% $SiO_2$, referred to $CaCO_3$, have been added with stirring, are reacted with 20% carbonic acid (500 litres of $CO_2$+2000 litres of air per hour). After about 27 minutes, the pH value has dropped to 7.3. The filter cake obtained has a water content of 65%, whilst the filter cake of a coarser calcium carbonate precipitated in the same manner but without the addition of sodium silicate, contains about 55% of water. After drying and grinding, a loose filler is obtained which has a specific surface of 53 m.$^2$/g. and an oil adsorption of 0.825 ml./g. (The corresponding values for the best commercial $CaCO_3$ filler are 34 m.$^2$/g. and 0.70 ml./g.)

*Example 3*

In a manner similar to that of Examples 1 and 2 a calcium carbonate filler is prepared with the addition of 4% $SiO_2$ in the form of sodium silicate. The specific surface of the dried and ground well dispersible filler is 63.5 m.$^2$/g. The microscopic picture shows, even more distinctly than in the case of the calcium carbonates produced according to Examples 1 and 2 with 1% and 2% $SiO_2$ content respectively, grape-like aggregates such as are typical of silicic acid fillers.

*Example 4*

To 12 litres of a 0.5 molar $Ca(OH)_2$ suspension are added with stirring 48 g. of commercial sodium silicate and 4.5 g. of the sodium salt of nitrilo-triacetic acid corresponding to 2% $SiO_2$ and 1% sodium salt of nitrilo-triacetic acid, referred to $CaCO_3$. Into this suspension there is introduced, similarly to the preceding examples, a 20% mixture of $CO_2$ and air (500 litres of $CO_2$+2000 litres of air/hour), until a pH value of 7.3 is attained, i.e. after 33 minutes. The washed filter cake has a water content of 69% and, after drying and grinding, yields an extremely finely divided calcium carbonate filler with a specific surface of 73 m.$^2$/g. and an oil adsorption of 0.79 ml./g. which, admittedly, is not so loose as the products of the preceding examples but still well dispersible. The microscope picture at 30,000-fold magnification shows very fine spherical primary particles which tend to form a secondary structure in the form of little rods. The X-ray diffraction pattern shows that the calcite structure is strongly disturbed, compared with commercial calcium carbonate.

*Example 5*

Into a cylindrical 20 litres container fitted with 4 radial wave breakers having a width of $\frac{1}{10}$ of the diameter, there are placed 15 litres of 0.5 molar milk of lime. A quadrangular gassing stirrer having an edge length of 43 mm. corresponding to 60 mm. diameter in the diagonal and a height of 10 mm. (according to German patent specification No. 1,032,719) serves for the distribution of the gas mixed from 20% of $CO_2$ and 80% of air. The stirrer rotates in the centre of the vessel about 80 mm. above the bottom at about 2000 r.p.m. This speed of rotation is sufficient for distributing the gas stream of 2500 litres per hour conducted through the hollow axle and leaving through slots at the stirrer edges, evenly throughout the whole volume of liquid.

To the milk of lime 6% $SiO_2$ referred to $CaCO_3$ is added in the form of silicic brine of pH 3 freshly prepared from dilute silicate solution ($Na_2O \cdot 3.3SiO_2$) and hydrochloric acid. Subsequently the gas stream is introduced at an initial temperature of about 18° C. In a first experiment carbonisation is carried out up to pH 11 and the resulting calcium carbonate filtered, washed, dried and ground. In further experiments, the process is carried out correspondingly, but the reaction continued to final pH values of 10; 9; 8.5; 8 and 7.1. Analysis of the resulting fillers shows for final pH values between 11 and 8, in addition to $CaCO_3$, a content of hydrated calcium silicate of the approximate formula $CaO \cdot (SiO_2)_{1-2} \cdot nH_2O$. The filler obtained by reacting until pH 7 contains only hydrated silicic acid in addition to $CaCO_3$. The properties of the fillers, otherwise prepared in equal manner, as a function of the final pH value are given in the following table.

| Final pH | Carbonisation time | Dry cont. of filter cake in percent | Settling volume in cc. | Specific surface accord. to BET in m.²/g. |
|---|---|---|---|---|
| 11 | 27 | 20 | 32 | 83 |
| 10 | 29 | 19 | 38 | 95 |
| 9 | 31 | 18 | 39 | 96 |
| 8.5 | 31.5 | 21 | 37 | 82 |
| 8 | 33 | 22 | 27 | 75 |
| 7.1 | 36 | 34 | 15 | 68 |

It can be seen that the properties of the filler are unfavourable at pH 7.1. The settling volume (2 g. of filler shaken in 98 g. of toluene and read after standing for an hour) amounts only to 15 cc., the BET value is lower than at higher pH values; the dry contents of the filter cake is substantially higher, corresponding to the denser packing of the particles. The most advantageous values are obtained in products carbonised to a pH value of about 9–10. They are especially loose and possess the highest BET values.

I claim:

1. In a process for preparing finely dispersed silicic acid-containing calcium carbonate by reacting aqueous suspensions of calcium hydroxide with gases containing carbon dioxide, the step which comprises effecting the reaction of carbon dioxide with calcium hydroxide suspensions containing about 0.1 to about 20% by weight of active silicic acid, calculated upon the quantity of calcium carbonate to produce a finely dispersed silicic acid-containing calcium carbonate.

2. In a process for preparing finely dispersed silicic acid-containing calcium carbonate by reacting aqueous suspensions of calcium hydroxide with gases containing carbon dioxide, the step which comprises effecting the reaction of carbon dioxide with calcium hydroxide suspensions containing about 0.5 to about 10% by weight of active silicic acid, calculated upon the quantity of calcium carbonate to produce a finely dispersed silicic acid-containing calcium carbonate.

3. Process as claimed in claim 1 in which the active silicic acid is prepared in the suspension of calcium hydroxide by adding an aqueous alkali metal silicate solution to the suspension of calcium hydroxide and introducing a gas containing carbon dioxide into the mixture.

4. Process as claimed in claim 1, in which the reaction is performed at a temperature between about 5 and about 50° C.

5. Process as claimed in claim 1, in which the reaction is performed at a temperature between about 5 and about 50° C. while intensely stirring.

6. Process as claimed in claim 1, in which the gas containing carbon dioxide consists of about 10 to about 50% by volume of carbon dioxide and about 90 to 50% by volume of an inert gas.

7. Process as claimed in claim 1, in which the calcium carbonate suspension containing silicic acid is heated to a temperature of between about 70° C. and 100° C.

8. Process as claimed in claim 1 in which the reaction between the calcium hydroxide in suspension and the gas containing carbon dioxide is interrupted as soon as a pH of between about 8 and about 12 is reached.

9. Process as claimed in claim 1 in which the reaction between the calcium hydroxide in suspension and the gas containing carbon dioxide is interrupted as soon as a pH of between about 8.5 and about 10 is reached.

References Cited in the file of this patent

UNITED STATES PATENTS

| | | |
|---|---|---|
| 1,715,439 | Van Nes | June 4, 1929 |
| 2,071,987 | Ridler | Feb. 23, 1937 |
| 2,617,711 | McAllister | Nov. 11, 1952 |
| 2,679,463 | Alexander | May 25, 1954 |
| 2,763,533 | Ashley et al. | Sept. 18, 1956 |
| 2,865,781 | Wainer | Dec. 23, 1958 |
| 2,927,091 | Liggett | Mar. 1, 1960 |
| 2,964,382 | Hall | Dec. 13, 1960 |

FOREIGN PATENTS

| | | |
|---|---|---|
| 1,025,847 | Germany | Mar. 13, 1958 |